United States Patent
Matsumoto et al.

[11] Patent Number: 5,825,149
[45] Date of Patent: Oct. 20, 1998

[54] MOBILE COMMUNICATION DEVICE HAVING A DIRECT COMMUNICATION CAPABILITY

[75] Inventors: Naoki Matsumoto; Manabu Otsuka, both of Aichi-gun; Koji Ogusu, Obu; Takaharu Idogaki, Okazaki, all of Japan

[73] Assignee: Nippondenso Co., Ltd., Kariya, Japan

[21] Appl. No.: 712,621

[22] Filed: Sep. 11, 1996

[30] Foreign Application Priority Data

Sep. 12, 1995 [JP] Japan ................................ 7-234362

[51] Int. Cl.⁶ .............................. G06F 15/50; G05D 1/02
[52] U.S. Cl. ............... 318/587; 318/568.12; 364/424.02; 180/79.1; 180/169
[58] Field of Search .................................. 318/139, 587, 318/568.1–568.23; 901/1, 3; 180/167–169, 79.1; 395/80–90; 364/424.02, 424.01, 424.06, 449, 461

[56] References Cited

U.S. PATENT DOCUMENTS

| | | | |
|---|---|---|---|
| 3,819,932 | 6/1974 | Auer, Jr. et al. | 246/1 R |
| 4,257,703 | 3/1981 | Goodrich | 356/4 |
| 4,379,497 | 4/1983 | Hainsworth et al. | 318/587 |
| 4,473,787 | 9/1984 | Schick | 318/587 |
| 4,561,076 | 12/1985 | Gritsch | 367/88 |
| 4,780,817 | 10/1988 | Lofgren | 364/424.01 |
| 4,783,618 | 11/1988 | Artrip | 318/587 |
| 4,941,103 | 7/1990 | Kato | 364/513 |
| 4,986,384 | 1/1991 | Okamoto et al. | 180/167 |
| 5,023,790 | 6/1991 | Luke, Jr. | 364/424.02 |
| 5,036,935 | 8/1991 | Kohara | 180/168 |
| 5,053,585 | 10/1991 | Yaniger . | |
| 5,075,853 | 12/1991 | Luke, Jr. | 364/424.02 |
| 5,091,855 | 2/1992 | Umehara et al. | 364/424.02 |
| 5,161,632 | 11/1992 | Asayama | 180/167 |
| 5,257,022 | 10/1993 | Irie | 340/988 |
| 5,267,173 | 11/1993 | Tanizawa et al. | 364/478 |
| 5,307,271 | 4/1994 | Everett, Jr. et al. | 364/424.02 |
| 5,367,456 | 11/1994 | Summerville et al. | 364/424.02 |
| 5,400,244 | 3/1995 | Watanabe et al. | 364/424.02 |
| 5,529,138 | 6/1996 | Shaw et al. | 180/169 |
| 5,589,827 | 12/1996 | Scurati | 340/901 |
| 5,617,199 | 4/1997 | Dunne | 356/5.01 |
| 5,621,417 | 4/1997 | Hassan et al. | 342/457 |
| 5,631,639 | 5/1997 | Hibino et al. | 340/903 |
| 5,646,613 | 7/1997 | Cho | 340/903 |
| 5,680,117 | 10/1997 | Arai et al. | 340/903 |
| 5,684,473 | 11/1997 | Hibino et al. | 240/903 |

FOREIGN PATENT DOCUMENTS 7-93032 4/1995 Japan .

*Primary Examiner*—Paul Ip
*Attorney, Agent, or Firm*—Cushman Darby & Cushman IP Group of Pillsbury Madison & Sutro LLP

[57] ABSTRACT

A mobile communication device can perform direct communication with another mobile communication device without providing a new communication circuit. The mobile device moves by driving wheels rotated by a motor. A pressure sensor is provided on an outer surface of the body of the communication device to detect contact pressure with another mobile communication device. A control circuit maintains a constant level of driving force of the motor when the communication device is in contact with another mobile communication device and receives data by determining changes in the detected contact pressure which correspond to the predetermined transmission data. Alternately, data exchanges maybe performed using the relative distance between the communication devices.

10 Claims, 15 Drawing Sheets

FIG. 9
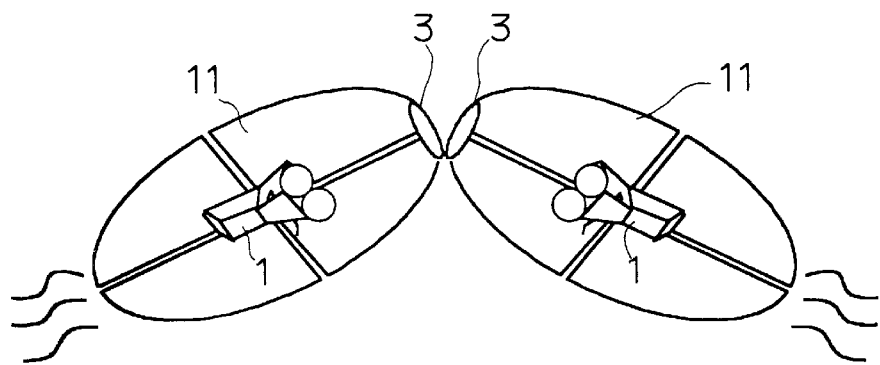
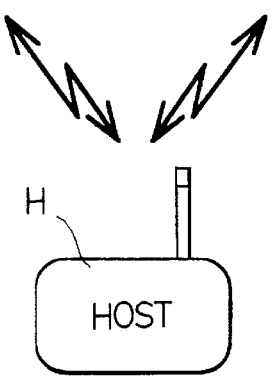
FIG. 10
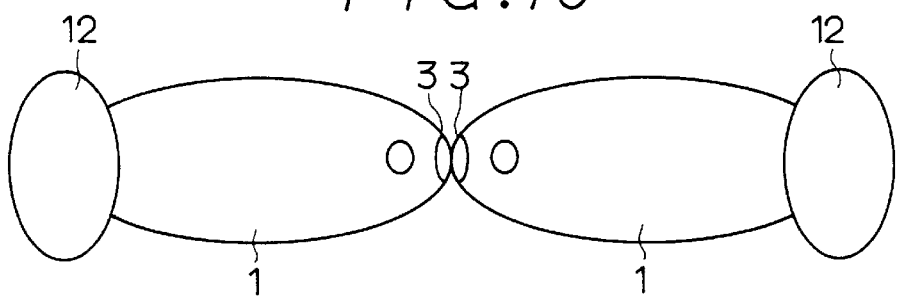
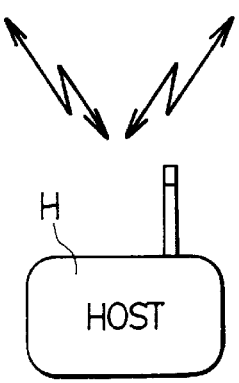

MOBILE COMMUNICATION DEVICE HAVING A DIRECT COMMUNICATION CAPABILITY

CROSS REFERENCE TO RELATED APPLICATION

This application is based on and claims priority from Japanese Patent Application No. Hei-7-234362, the contents of which are incorporated herein by reference.

BACKGROUND OF THE INVENTION

1. Field of the Invention

The present invention relates to a mobile communication device. In particular, the present invention relates to a mobile communication device which has a simple construction and which can execute direct communication with other mobile devices without using an additional communication circuit.

2. Description of Related Art

More and more operations in which a plurality of mobile robots and multiple-joint arms operate together are being carried out, and therefore, there is a need for such robots and the like to refer to past operation data so that their operations can be carried out smoothly. Conventionally, with this kind of communication between the robots, a central communication host, which provides operational commands to each robot, is used as a relay station so that communication can be carried out indirectly between each of the robots.

However, with such indirect communication being performed via the communication relay host, the amount and frequency of communication operations that can be carried out when the plurality of robots operate simultaneously and perform mutual communication frequently is limited by the processing capacity of the communication relay host and thus, this hampers the smooth operation of processes implemented through cooperation between the robots.

One solution to the above problem is to perform direct communication between the robots without passing through the communication relay host; however, the provision of special communication circuits for each of the robots and the multi-joint arms presents new problems of reduced space availability and increased costs.

SUMMARY OF THE INVENTION

In view of the foregoing problems in the prior art, it is a primary object of the present invention to provide a mobile communication device for performing direct communication with other mobile devices without providing a separate communication circuit which occupies space and increases costs.

To achieve this aim, a first aspect of the present invention provides a mobile communication device which includes a body, a driving unit, a detecting unit, a receiving unit and a transmission unit. The driving unit is for generating a driving force to move the body. The detecting unit is disposed on an outer surface of the body and detects contact pressure of the body with an external device. The receiving unit is for maintaining the driving force of the driving unit at a constant level in a forward direction towards the external device when the body is in contact with the external device and for receiving information from the external device by determining change of the contact pressure detected by the detecting unit. The transmission unit is for transmitting predetermined information to the external device by varying the magnitude of the driving force of the driving unit in the forward direction towards the external device in accordance with the predetermined information when the body is in contact with the external device.

In this way, using the driving unit and the detecting unit, the contact pressure when the body is in contact with another device can be detected so that information can be received from and transmitted to the other device by varying the driving force to vary the contact pressure. Thus, there is no need to provide an additional communication circuit and there will be no problems regarding increased costs and reduced space availability.

A second aspect of the present invention provides a mobile communication device which includes a detecting unit coupled to the body for detecting relative distance between the body and the external device, a receiving unit for receiving information from the external device by determining the relative distance between the body and the external device, and a transmission unit for transmitting predetermined information to the external device by controlling the driving unit to change the relative distance between the body and the external object in accordance with the predetermined information.

Preferably, a plurality of mobile communication devices form one mobile communication system. In such a communication system, different delay times are assigned to each mobile communication device to determine which device will act as the receiver or the transmitter when the devices come near or come into contact with each other. When a mobile communication device does not detect a change in the contact pressure or the relative distance with another mobile communication device within the delay time assigned to it, the mobile communication device is designed to act as the transmitter for transmitting information to the other mobile communication devices. Otherwise, it will have to act as the receiver for receiving information transmitted by the other mobile communication devices. In this regard, transmission operations starts from the mobile communication device that has a relatively short delay time so that collision with the transmission operations of the other communication devices does not occur.

BRIEF DESCRIPTION OF THE DRAWINGS

Additional objects and advantages of the present invention will be more readily apparent from the following detailed description of preferred embodiments thereof when taken together with the accompanying drawings in which:

FIG. 9 is a schematic side view illustrating another type of mobile communication device according to the first embodiment;

FIG. 10 is a schematic side view illustrating yet another type of mobile communication device according to the first embodiment;

DETAILED DESCRIPTION OF PRESENTLY PREFERRED EXEMPLARY EMBODIMENTS

Preferred embodiments of the present invention are described hereinafter with reference to the accompanying drawings.

Figure 1:
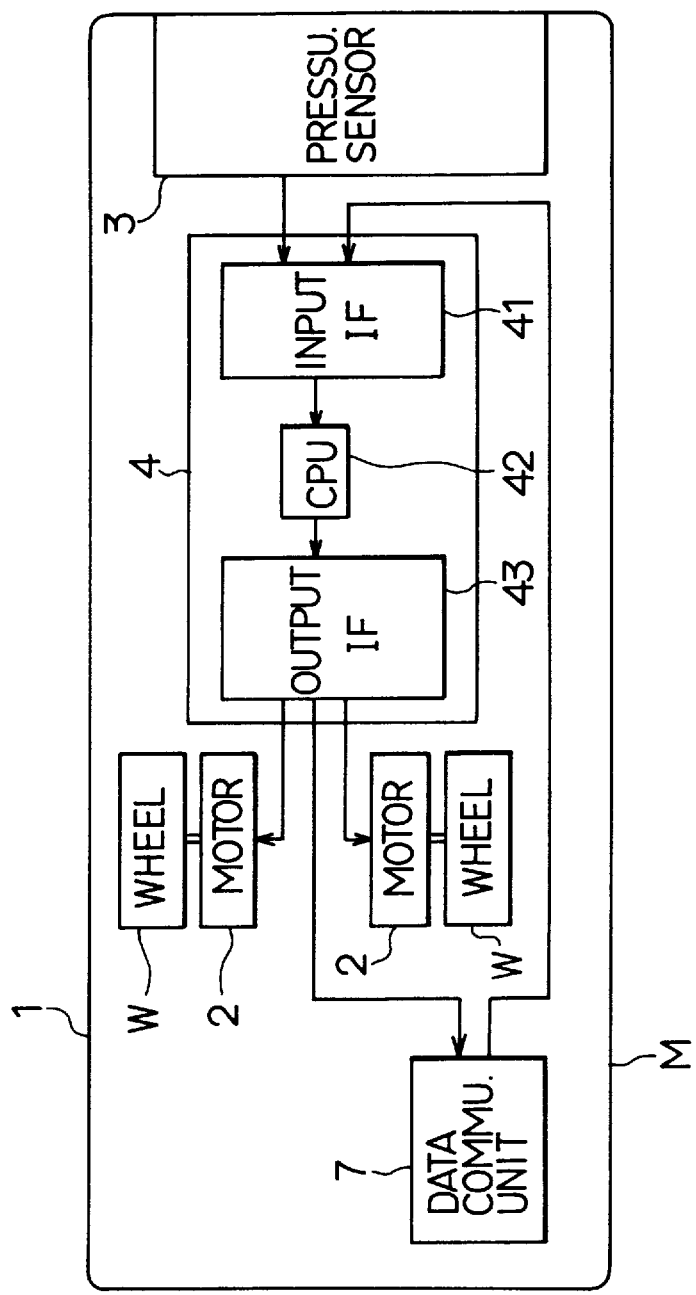
FIG. 1 is a block diagram of a mobile communication device according to a first embodiment of the present invention.

FIG. 1 illustrates a rectangular mobile communication device M according to a first embodiment of the present invention. As shown in FIG. 1, driving wheels W are provided in left and right portions of a body 1 of the mobile communication device M along a longitudinal direction of the body 1. In addition, driving motors 2 are connected to each of the driving wheels W. The driving motors 2 are rotated back and forth in accordance with an output signal from a control circuit 4. Thus, the body 1 can move in any direction. It must be noted here that the free running wheels have been omitted from the Figure.

The control circuit 4 includes an input IF (interface) circuit 41, a CPU 42 and an output IF circuit 43. The output signals to each of the driving motors 2 are provided via the output IF circuit 43.

A pressure sensor 3 for detecting contact pressure with another mobile communication device is provided on one side surface of the body 1. A detection signal generated by the pressure sensor 3 is provided to the CPU 42 via the input IF circuit 41. It must be noted here that the pressure sensor 3 may be provided for each side surface of the body 1.

A data communications unit 7 for exchanging data with a central communication host H (shown in FIG. 2) is provided inside the body 1 and the data communications unit 7 is connected to the CPU 42 via the input IF circuit 41 and the output IF circuit 43.

Figure 2:
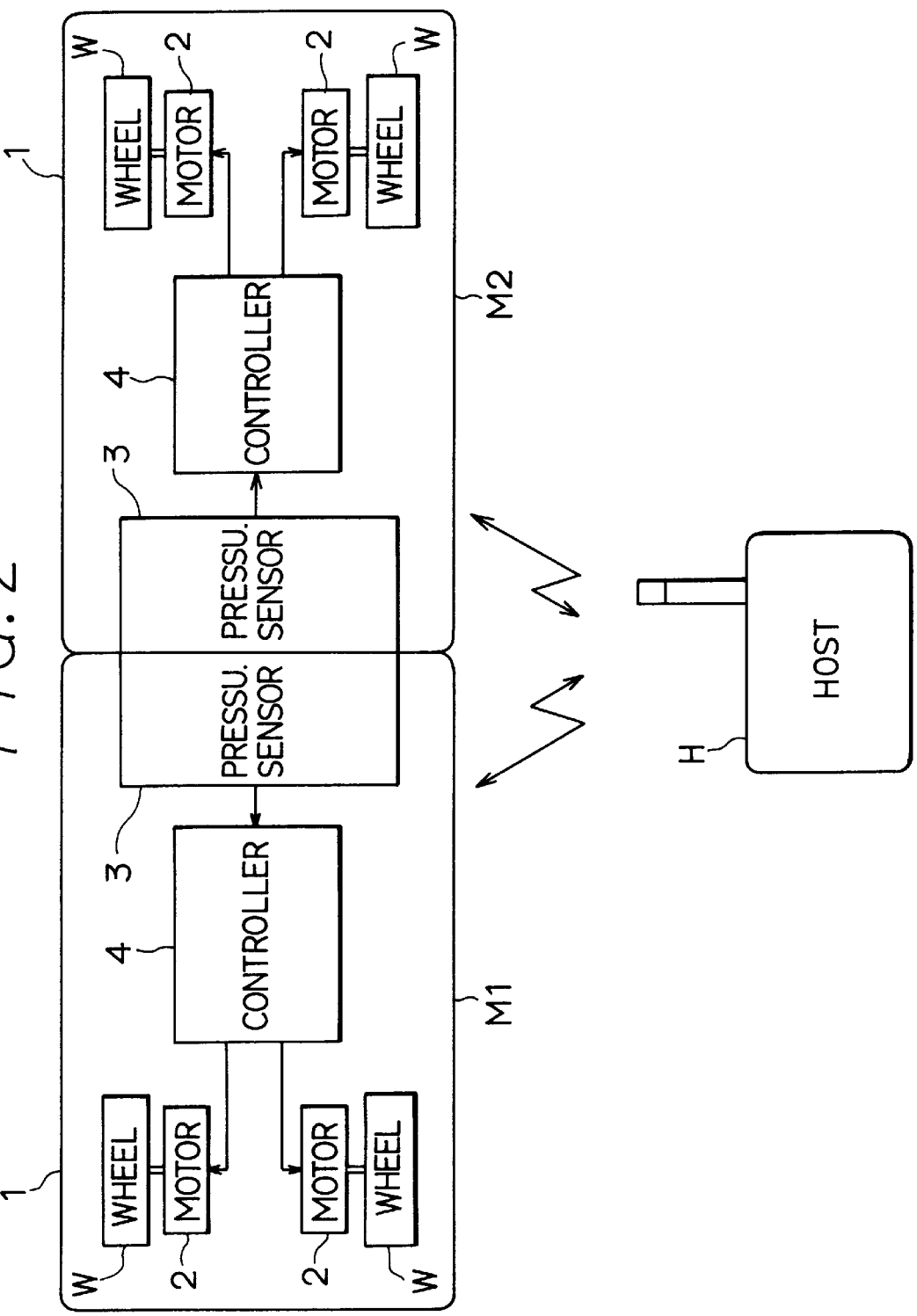
FIG. 2 is a schematic view illustrating contact between communication devices according to the first embodiment.

As shown in FIG. 2, when two mobile communication devices M1, M2 perform direct communication, both of these devices M1, M2 make their end surfaces equipped with the respective pressure sensors 3 contact each other.

Figure 3:
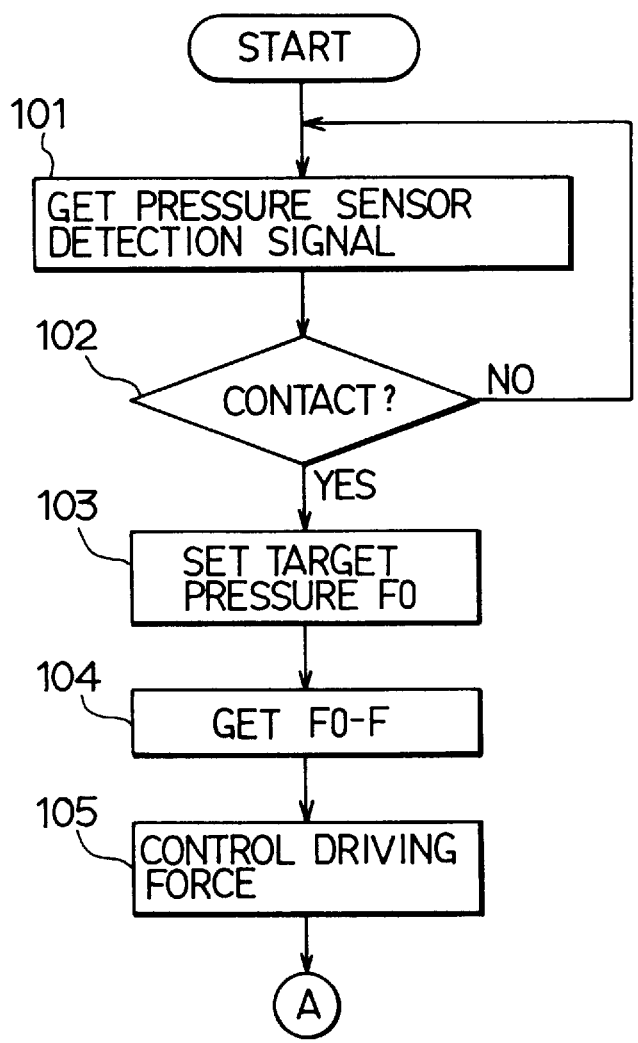
FIGS. 3 and 4 show a flowchart of a CPU process according to the first embodiment.

FIG. 3 is a flowchart of a direct communication process of the CPU 42. In this communication process, step 101 reads detection signals of the pressure sensor 3 and step 102 determines if there is contact with another mobile communication device or not. That is, when the value of a detected contact pressure F is zero or is small enough to be regarded as zero in consideration of noise, then step 102 determines that the present device is not in contact with another mobile communication device, and thus, control returns to step 101.

When step 102 determines that there is contact with another mobile communication device, step 103 sets a target contact pressure F0 and step 104 calculates a difference (F0–F) between the target contact pressure F0 and the detected contact pressure F. Step 105 controls a driving force D of the driving wheel W toward another device to properly set the detected contact pressure F to the target contact pressure F0.

In this case, the target driving force D is obtained by proportional-plus-integral control of the difference (F0–F). It should be noted here that proportional-plus-integral-plus-derivative control may also be performed on the difference (F0–F).

Figure 5A:
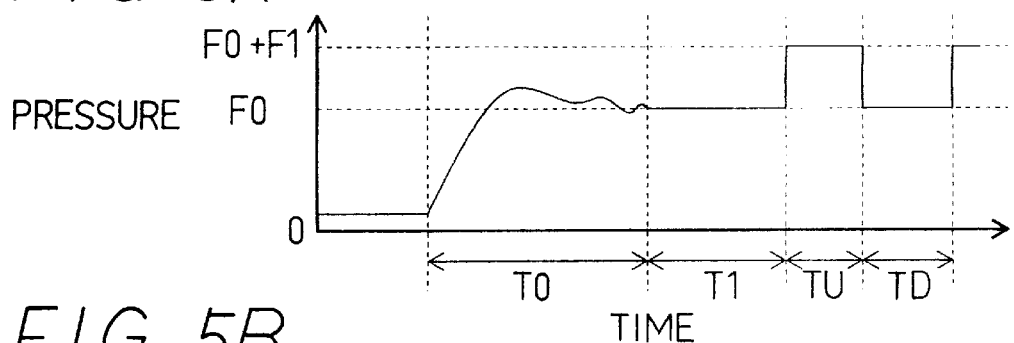
FIGS. 5A and 5B are time charts showing temporal changes in the contact pressure and the driving force of a mobile communication device acting as the transmitter according to the first embodiment.
Figure 5B:
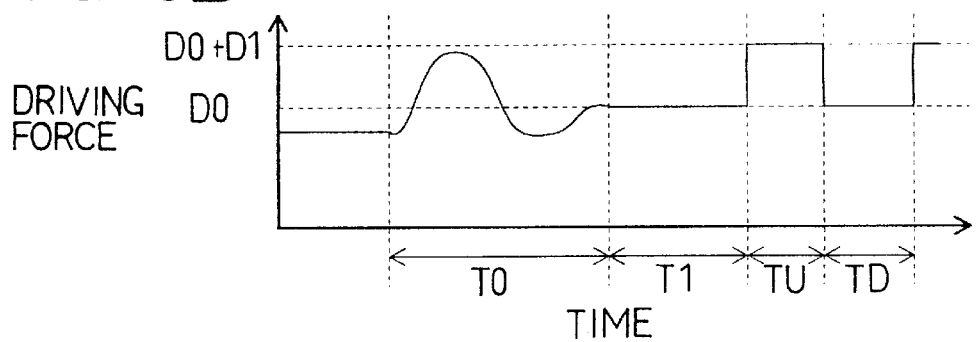
Figure 6A:
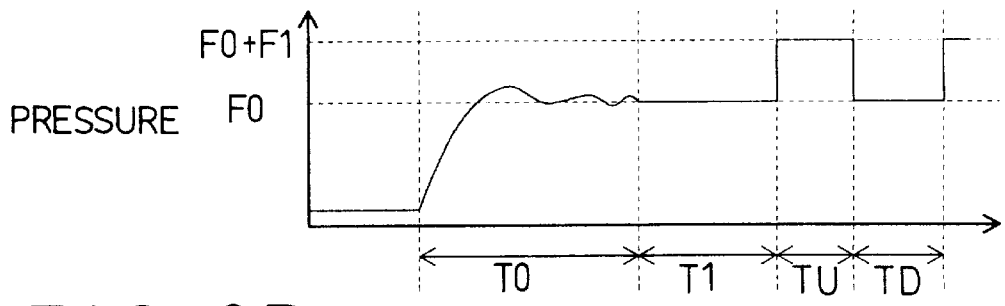
FIGS. 6A and 6B are time charts showing temporal changes in the contact pressure and the driving force of a mobile communication device acting as the receiver according to the first embodiment.
Figure 6B:
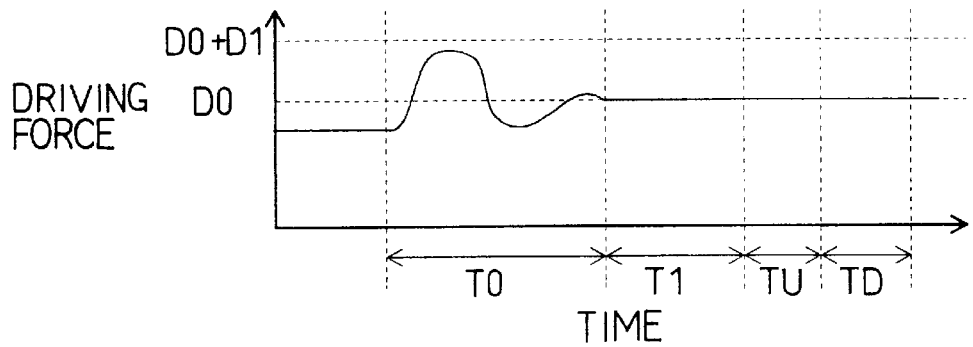

By performing contact pressure control, the detected contact pressure F and the driving force D of the mobile communication device M1 changes within time period T0 as shown in FIGS. 5A and 5B. The detected contact pressure F and the driving force D of the mobile communication device M2 changes within time T0 as shown in FIGS. 6A and 6B. As a result, the detected contact pressures F and the driving forces D of both communication devices M1 and M2 converge to F0 and D0, respectively.

Figure 4:
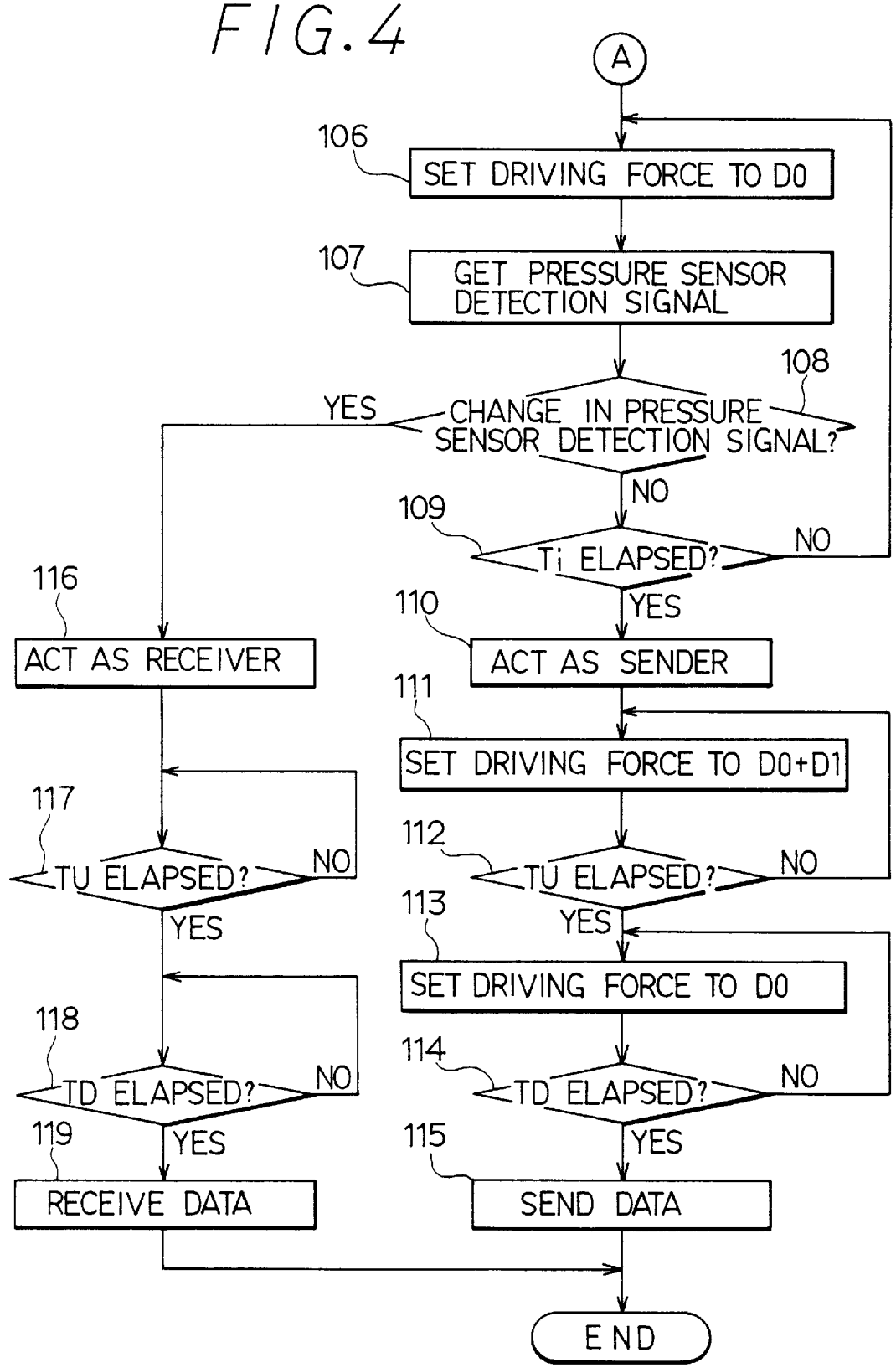

While the contact pressure is maintained at the F0 level through contact pressure control, the CPU 42 executes a communication determination procedure shown in step 106 and subsequent steps of the flowchart of FIG. 4. This communication determination procedure is for determining from which device communication should start from after mobile communication devices M1 and M2 come into contact with each other. That is, step 106 sets the driving force D to D0, step 107 reads the detection signal of the pressure sensor 3 and step 108 determines whether or not there is a change in the detection signal. In other words, step 108 determines if the detection signal is substantially constant or not. Substantially constant, as used hereinafter and in the appended claims, means that the change in the detection signal is within a certain level of variation for accounting noise and the like. Step 109 determines whether or not hold time Ti, which is a unique delay time assigned to each mobile communication device M, has elapsed or not.

When the detection signal changes before the elapse of the hold time Ti, step 116 determines that the mobile communication device M will have to act as the receiver with the assumption that the other mobile communication device has started transmission and control then goes to step 117. On the other hand, when the detection signal does not change within the hold time Ti, step 110 determines that the mobile communication device M will have to act as the transmitter with the assumption that the other device will not transmit signals and control then goes to step 111.

As noted above, each mobile communication device has a unique hold time T. For example, when the hold times T1 and T2 of respective communication devices M1 and M2 are set such that T1<T2, the communication device M2 will not perform transmission operations within the time period T1, and so, the communication device M1 will have to act as the transmitter. That is, the transmission starts from the communication device which has a relatively shorter hold time after the communication devices make contact with each other.

When the mobile communication device M determines in step 110 that it will have to act as the transmitter, step 111 sets the driving force D to D0+D1, which is larger than the initial driving force by D1, and step 113 returns the driving force to the D0 level after step 112 determines that a time period TU has elapsed. When time period TD has elapsed after returning the driving force D to the D0 level, data transmission, which is described later, to the other communication device is started.

When the mobile communication device M determines in step 116 that it will have to act as the receiver, steps 117 and 118 determine if time intervals TU and TD have elapsed or not and step 119 starts data reception.

FIGS. 5A, 5B, 6A and 6B illustrate temporal changes in the contact pressures and the driving forces of the mobile communication devices M1, M2 during the execution of the above steps. That is, as shown in FIG. 5B, for the communication device M1, during time interval TU after the elapse of time interval T1, there is a step increase in the driving force D from D0 to D0+D1. Therefore, the contact pressure increases correspondingly from F0 to F0+F1 in FIG. 5A. Later on, after the elapse of time TD, there is a step decrease in the driving force from D0+D1 to D0 with the contact pressure decreasing correspondingly from F0+F1 to F0.

For the communication device M2, although the driving force D is maintained at the constant level D0 as shown in FIG. 6B, in the same way as the communication device M1, the contact pressure varies between F0 and (F0+F1) because of reaction to the pressure exerted by the mobile communication device M1.

Figure 7:
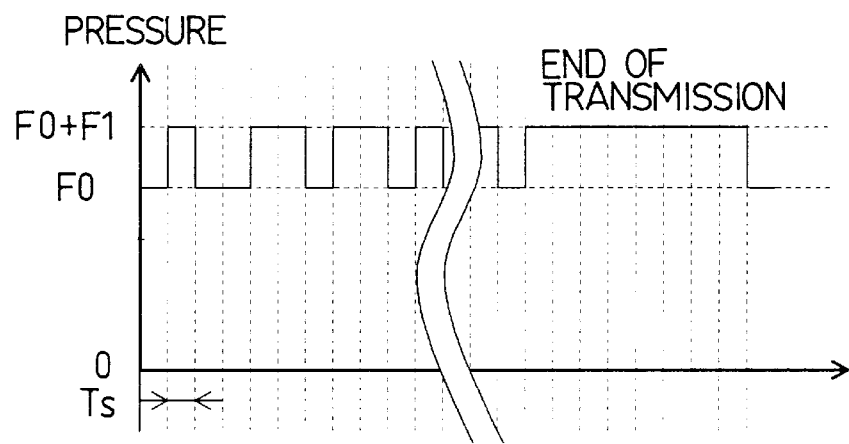
FIG. 7 is a time chart showing change in the contact pressure according to the first embodiment.

Step 115 starts the transmission of data after the end of time interval TD. The temporal change in the contact pressure during data transmission is illustrated in FIG. 7. The data transmission is carried out here with data in the form of binary digital data with time Ts as the unit of time. That is, the communication device M1 varies the driving force D between D0 and D0+D1 in accordance with the predetermined transmission data, and therefore, the communication device M2 receives data based on the change in the contact pressure which varies between F0 and F0+F1 as shown in FIG. 7. That is, the communication device M2 determines the level of the contact pressure for every time interval Ts with the contact pressure level being set to "0" when pressure is equal to F0, contact pressure level being set to "1" when pressure is equal to F0+F1. It must be noted here that eight bits form one data stream. Data transmission is considered to be complete when a stream of eight bits which all indicate the level "1" is received. It must be noted here that data as referred to here refers to position information, past operation history, necessary operation data or the like.

After the completion of the transmission from the communication device M1, the driving force D of the communication device M1 is maintained at D0 and the driving force D of the mobile communication device M2 changes between D0 and D0+D1 in accordance with transmission data so that data transmission from the device M2 to the device M1 can be executed.

Thus, according to the present embodiment, with the use of contact pressure sensors which are usually installed in robots and the like for preventing collision, direct communication between mobile devices can be performed at a low cost without providing additional space and a special communication circuit.

Figure 8:
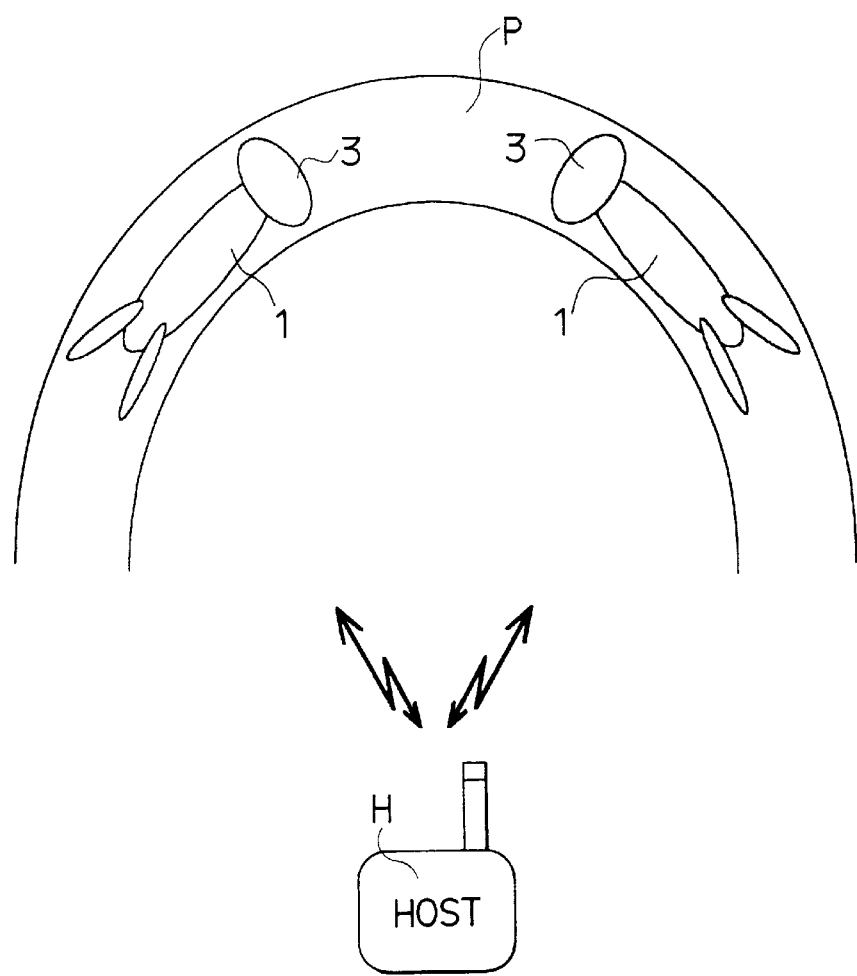
FIG. 8 is a schematic side view illustrating one type of mobile communication device according to the first embodiment.

It must be noted here that the present invention can be applied to a variety of mobile devices. As examples of mobile communication device to which the present embodiment can be applied to other than those devices which travel on flat surfaces, FIG. 8 shows devices which move inside a pipe P and which have pressure sensors 3 at tip ends of their bodies 1, FIG. 9 shows devices that can fly and which have pressure sensors 3 at tip ends of their wings 11 and FIG. 10 shows devices which move underwater using screws 12 and which have pressure sensors 3 at tip ends of their bodies 1.

Figure 11:
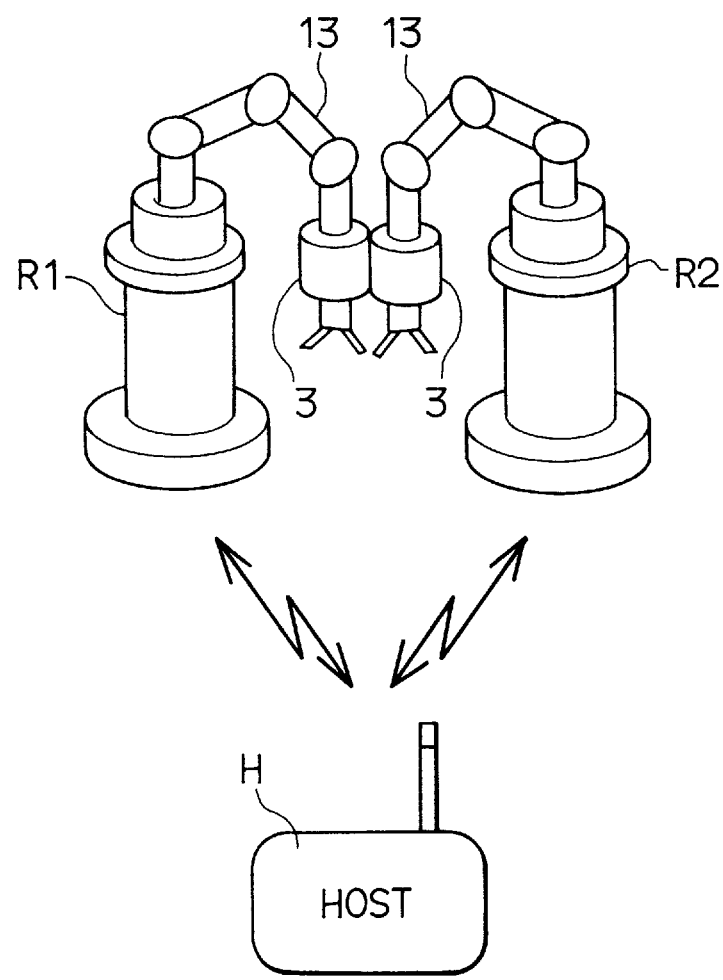
FIG. 11 is a schematic perspective view illustrating still another type of mobile communication device according to the first embodiment.

Furthermore, the mobile communication devices may also be multiple joint arms 13 of industrial robots R1, R2 as shown in FIG. 11. In this case, the pressure sensors 3 are disposed at portions of the multiple joint arms 13 so that direct communication can be carried out by making the arms 13 of the industrial robots R1, R2 contact each other.

When the mobile communication device is in contact with a plurality of other mobile communication devices, transmission priority can be determined based on the magnitude of the contact force and the hold time when determining which device will act as the transmitter and which device will act as the receiver.

Figure 12:
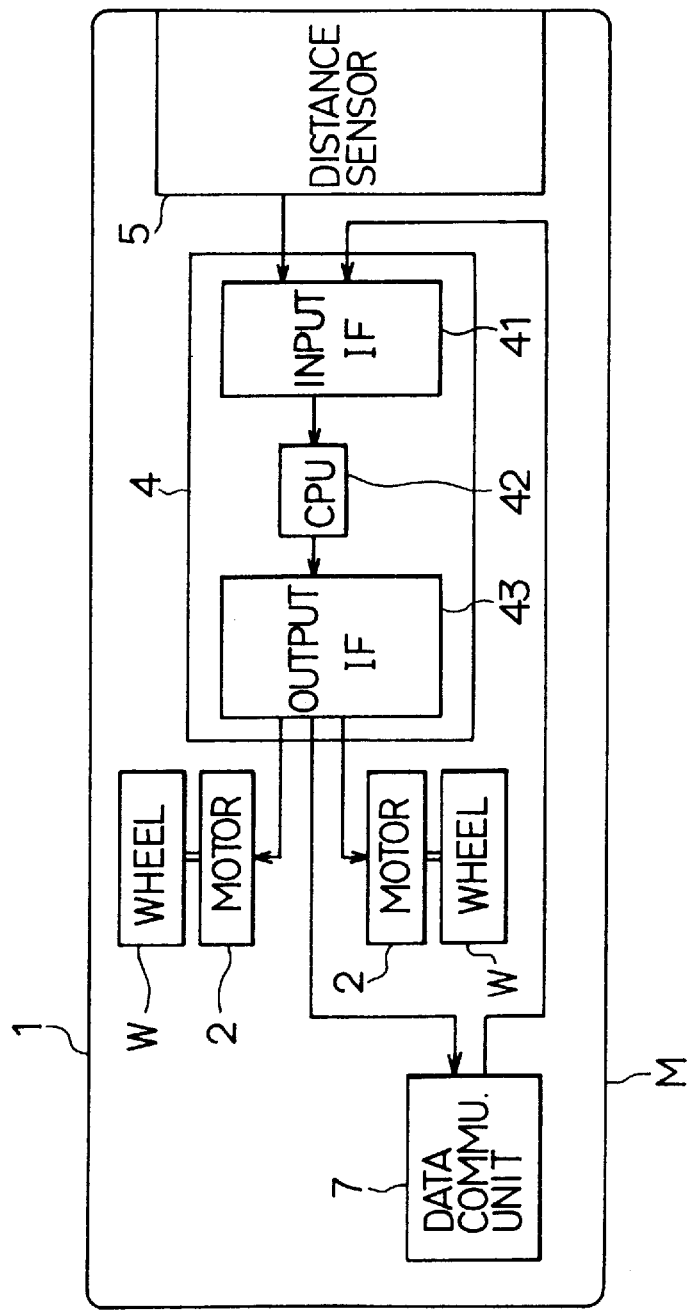
FIG. 12 is a block diagram of a mobile communication device according to a second embodiment of the present invention.

FIG. 12 illustrates a construction of a mobile communication device M according to a second embodiment of the present invention. Since this device is similar to that of the first embodiment, explanation will center only on the differences of the device of the present embodiment with respect to that of the first embodiment. In place of the pressure sensor, a distance sensor 5 using ultrasonic wave or the like is disposed at a side surface of the body 1. A detected signal generated by the distance sensor 5 is provided to the CPU 42 via the input IF circuit 41. It must be noted here that the distance sensor 5 may be provided for each side surface of the body 1.

Figure 13:
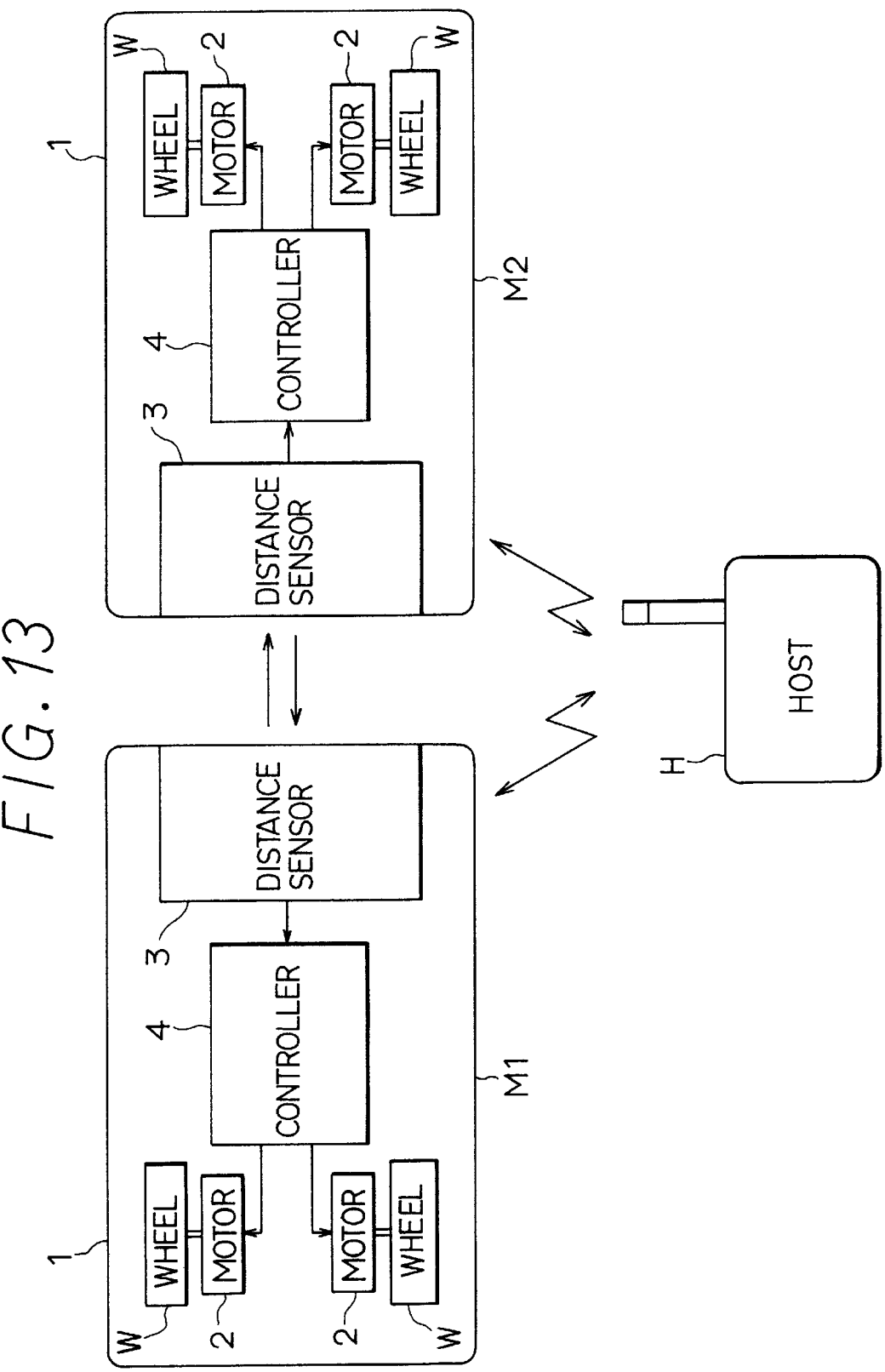
FIG. 13 is a schematic view illustrating approaching mobile communication devices according to the second embodiment.

As shown in FIG. 13, when mobile communication devices M1 and M2 perform direct communication, the devices M1 and M2 make their end surfaces provided with the distance sensors 5 face each other with a constant distance separating them.

Figure 14:
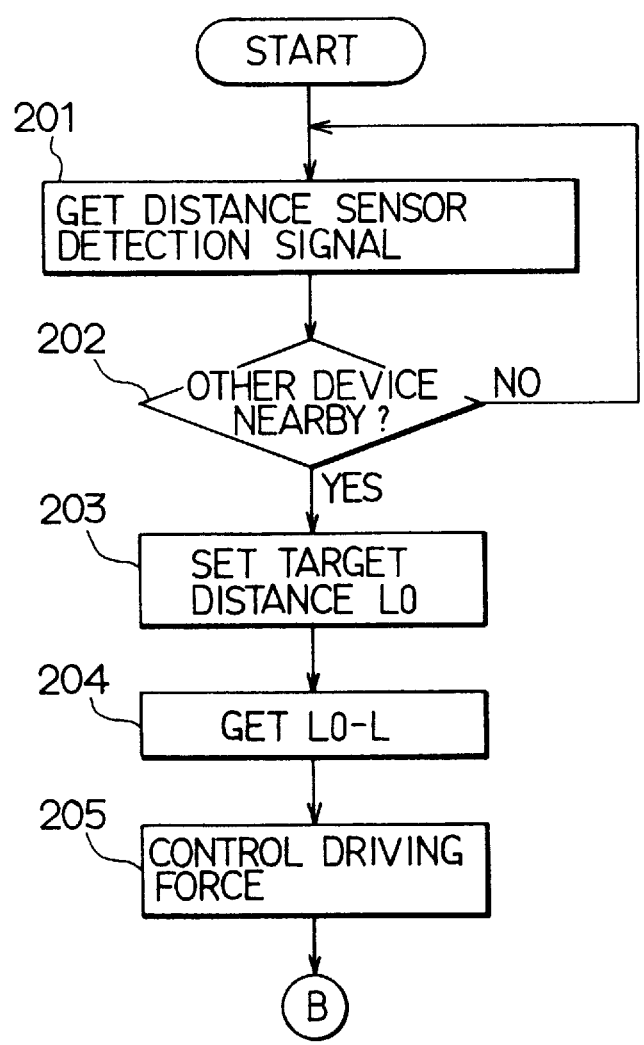
FIGS. 14 and 15 show a flowchart of a CPU process according to the second embodiment.

FIG. 14 illustrates a direct communication process of the CPU 42. Step 201 reads the detection signal of the distance sensor 5 and step 202 determines if the other device is nearby or not. That is, when the other mobile communication device is not within the detection range of the distance sensor 5, that other mobile communication device is determined not to be nearby and so, control returns to step 201.

When step 202 determines that the other device is nearby, step 203 sets a target distance L0 and step 204 calculates a difference L0–L between the target distance L0 and a detected distance L. The driving force D of the driving wheel W towards the other device is controlled so that step 205 can set the detected distance L to the target distance L0. In this case, when controlling the driving force D, the driving force D is controlled to become zero when the difference F0–F is zero.

Figure 16A:
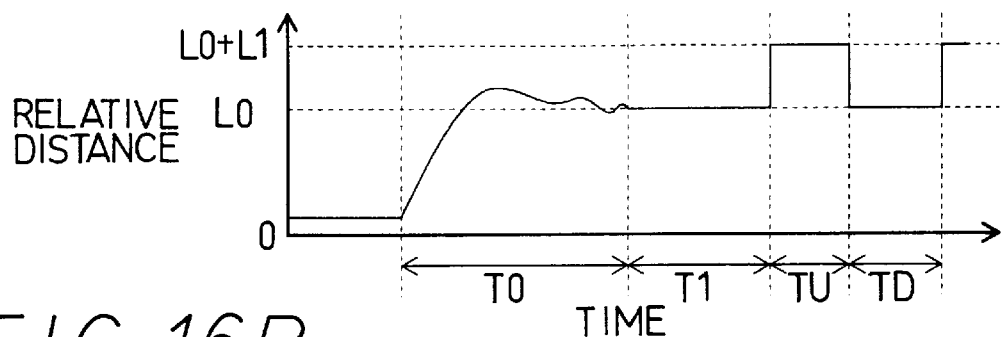
FIGS. 16A and 16B are time charts showing temporal changes in the relative distance and the driving force of the mobile communication device acting as the transmitter according to the second embodiment.
Figure 16B:
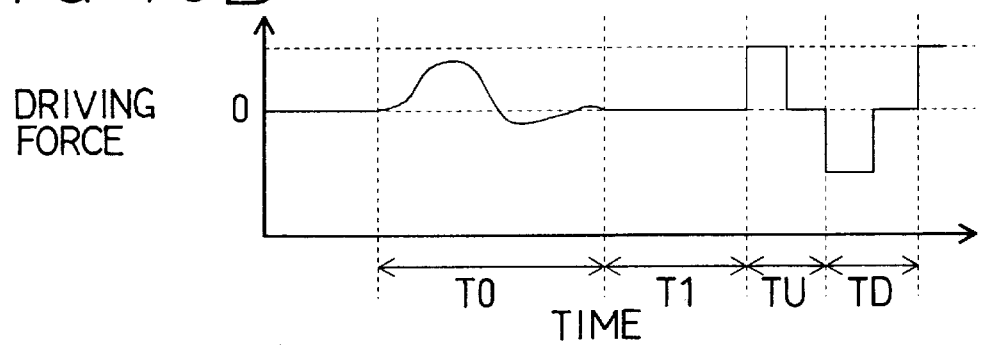
Figure 17A:
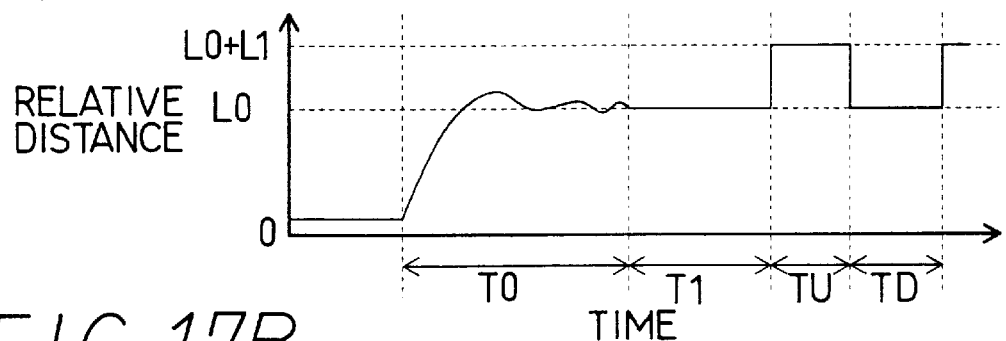
FIG. 17A and 17B are time charts showing temporal changes in the relative distance and the driving force of the mobile communication device acting as the receiver according to the second embodiment.
Figure 17B:
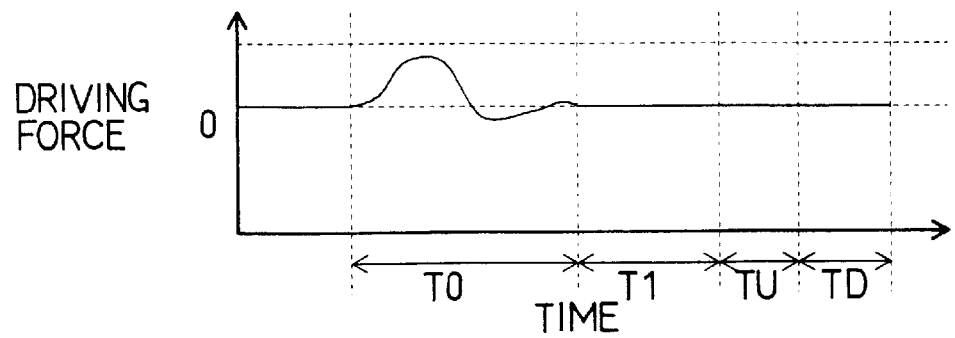

With such distance control, the detected distance L and the driving force D of the mobile communication device M1 change during time interval T0 as shown in FIGS. 16A and 16B. The detected distance L and the driving force D of the mobile communication device M2 change during time interval T0 as shown in FIGS. 17A and 17B. As a result, the detected distances of communication devices M1 and M2 converge to L0 while the driving force of the same devices M1 and M2 converge to zero.

Figure 15:
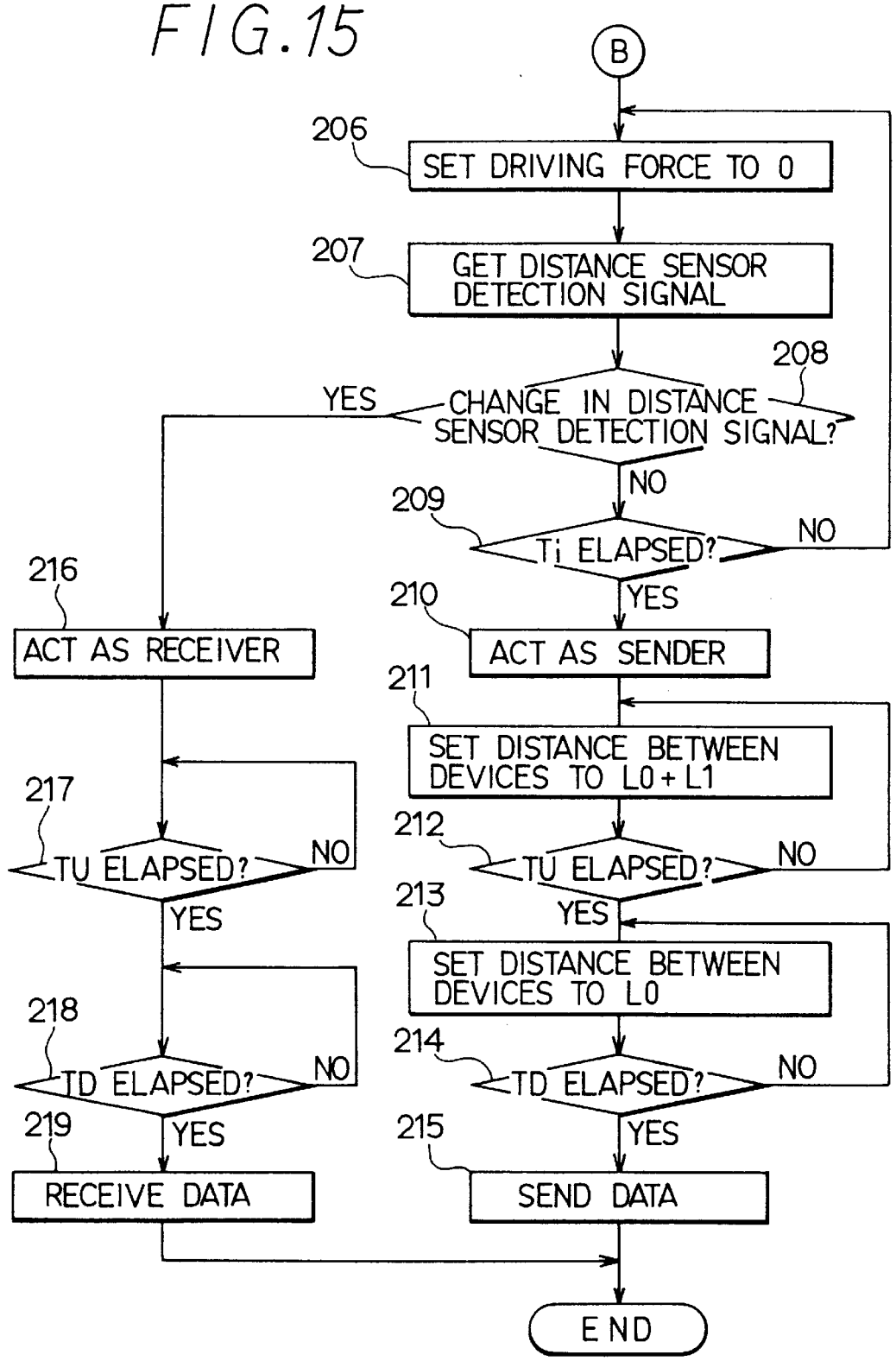

With distance control being executed to keep the relative distance at the constant value L0, the CPU 42 determines whether the communication device will act as the transmitter or as the receiver as shown in the flowchart of FIG. 15. The above process is for determining if the device will have to first act as the transmitter or not after determining it is near other communication devices. That is, step 206 sets the driving force D to zero, step 207 reads the detected signal of the distance sensor 5 and step 208 determines whether or not there is a change in the detected signal. It should be noted that step 208 determines if the detected signal is substantially constant or not. Steps 206 through 208 are repeated until step 209 determines that the unique hold time Ti, which is uniquely assigned to each device M, has elapsed.

When the detected signal changes before the elapse of the hold time Ti, the mobile communication device determines in step 216 that it will have to act as the receiver with the assumption that the other communication device will start transmission and so, steps 217 to 219 are executed. On the other hand, when the detected signal does not change before the hold time Ti elapses, the mobile communication device determines in step 210 that it will have to act as the transmitter with the assumption that the other communication device will not perform transmission operations and so, steps 211 to 215 are executed.

As noted above, each mobile communication device is assigned with a unique hold time Ti. For example, when the hold times T1 and T2 of respective communication devices M1, M2 are set such that T1<T2, the mobile communication device M2 will not perform transmission operations within the time interval T1. In this way, the communication device M1 acts as the transmitter. That is, after the communication devices are determined to be near each other, transmission starts from the communication device which has a relatively shorter hold time.

When the mobile communication device M determines in step 210 that it will have to act as the transmitter, step 211 properly sets the distance between the mobile communication devices M1, M2 to a value L0+L1 by controlling the driving motor 2 for a time interval TU. After the elapse of time interval TU, the distance is returned to L0. After a time interval TD has elapsed after the distance is returned to L0, data transmission, which is described later, with respect to another communication device is started.

When the communication device determines in step 216 that it has to act as the receiver, step 219 starts receiving data after steps 217 and 218 determine that time interval TU+TD has elapsed.

FIGS. 16A, 16B, 17A and 17B illustrate the temporal change between the relative distance between mobile communication devices M1, M2 and their driving forces. That is, as shown in FIG. 16B, for the communication device M1, there is a step increase in the driving force D in a positive direction within the time interval TU after the elapse of time interval T1. The body 1 of the mobile communication device M1 moves and the relative distance between the mobile communication devices M1 and M2 increases from L0 to L0+L1 as shown in FIG. 16A (although the increase of the distance is practically accompanied by a time delay, such a time delay is not considered here). The driving force D is returned to zero within the time interval TU and later the driving force D is step increased towards a negative direction within the time interval TD and so, the relative distance between the communication devices M1 and M2 decreases from L0+L1 to L0.

Figure 18:
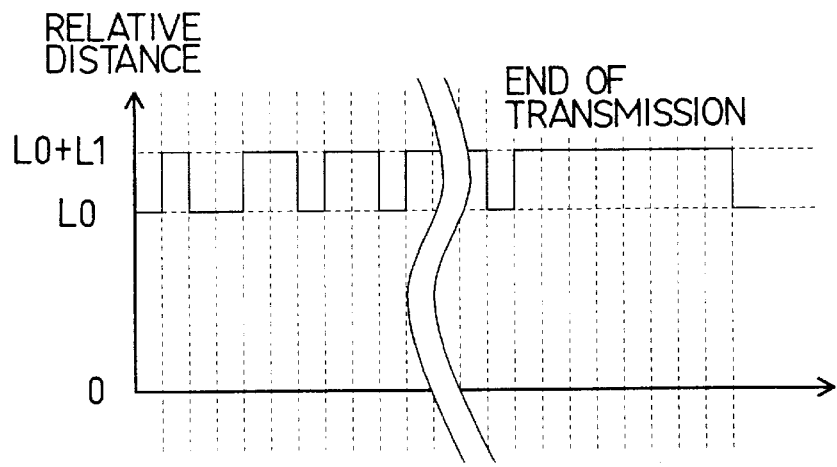
FIG. 18 is a time chart showing change in the relative distance according to the second embodiment.

Step 215 starts data transmission after the lapse of time interval TD. FIG. 18 illustrates the temporal change of the relative distance during data transmission. The data transmission is carried out in the form of binary serial digital data with unit time set as time Ts. That is, the driving force D is changed positively/negatively in accordance with the values of the transmission data in the communication device M1. The communication device M2 receives data based on changes in the distance between L0 and L0+L1 as shown in the same Figure. That is, the communication device M2 determines the level of the detected distance at every time Ts and sets the level of the detected distance to "0" when the detected distance is L0 and to "1" when the detected distance is L0+L1 with data being transmitted in sets of 8 bits. The transmission of data is determined to be complete when all 8 bits of a data set are "1".

When the data transmission operation of the communication device M1 is complete, the driving force of the device M1 is maintained at zero. The relative distance changes by changing the driving force of the communication device M2 positively/negatively in accordance with the transmission data so that data transmission from the communication device M2 to the communication device M1 is performed.

According to the present embodiment, by using the distance sensor which is normally installed for mobile robots or the like and the driving motor, direct communication between the mobile communication devices can be carried out at a low cost without any need for additional space and a special communication circuit.

Figure 19:
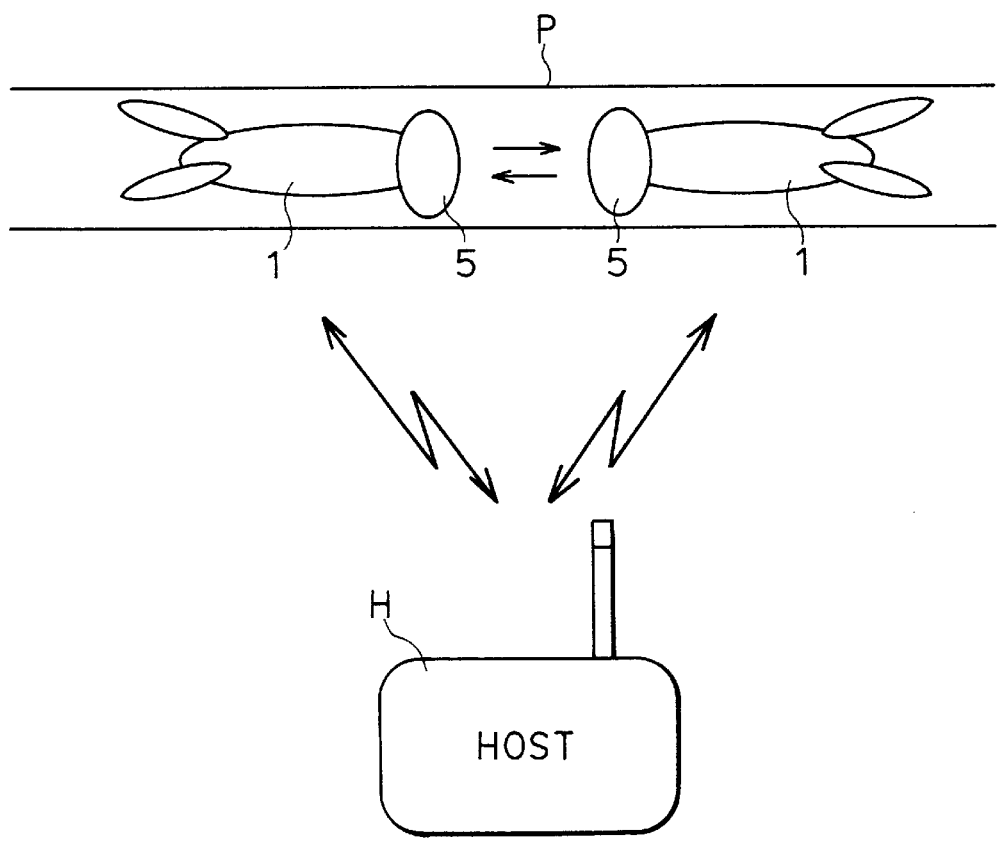
FIG. 19 is a schematic side view illustrating one type of mobile communication device according to the second embodiment.

As examples of mobile communication devices to which the foregoing embodiment can be applied other than those devices which move on flat surfaces, FIG. 19 shows mobile communication devices which move inside a pipe P and which are installed with distance sensors 5 at tips of their bodies 1. In this case, instead of moving the devices in a forward and backward direction, it may also be that the distance between the communication devices is changed by providing their bodies 1 with a expanding and contracting mechanism so that these devices could expand and contract.

In addition, the present embodiment can also be applied to devices that can fly by providing the distance sensors 5 at tips of the wings of the devices or to devices that move underwater using screws by providing the distance sensors at the tips of the bodies of such devices.

Figure 20:
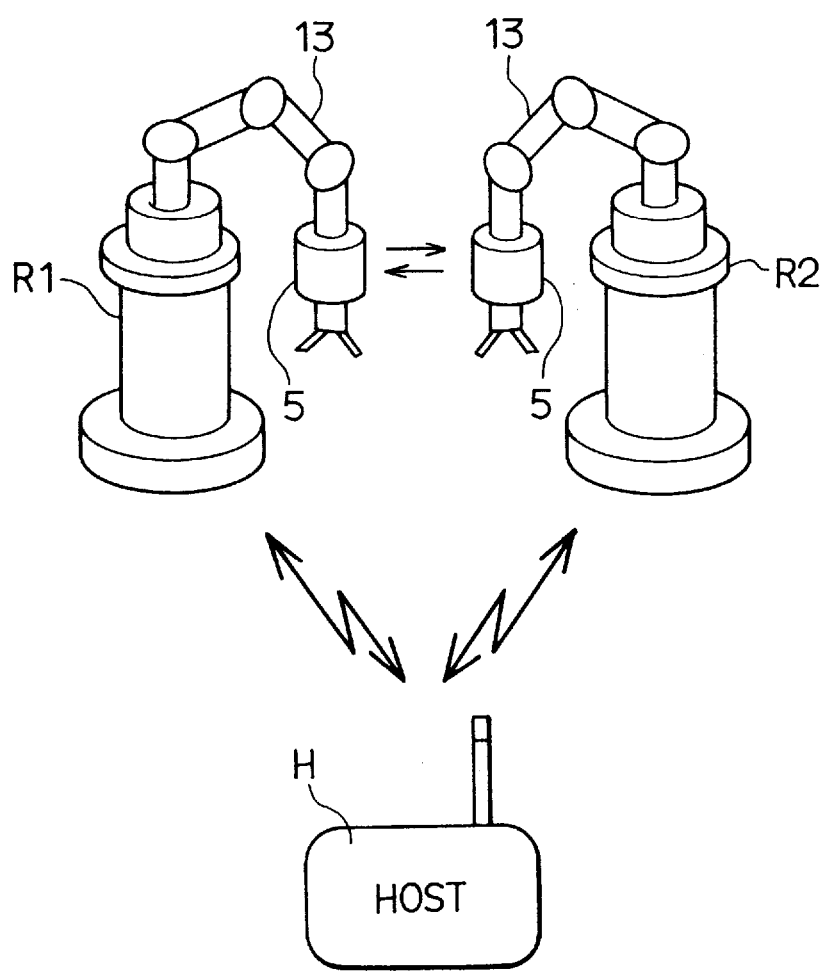
FIG. 20 is a schematic side view illustrating another type of mobile communication device according to the second embodiment.

As shown in FIG. 20, the mobile communication device can be multiple-joint arms 13 of industrial robots R1 and R2. In this case, the distance sensors 5 are provided at portions of the multiple-joint arms 13. The arms 13 of the industrial robots R1 and R2 approach each other so that direct communication can be carried out between them by changing the distance between the arms 13 in accordance with predetermined data.

Although contact pressure and distance change in the form of binary serial digital data have been used here as the transmission data, digital data that can take three or more values may also be used as well as analog data.

Although the present invention has been fully described in connection with preferred embodiments thereof with reference to the accompanying drawings, it is to be noted that various changes and modifications will become apparent to those skilled in the art. Such changes and modifications are to be understood as being within the scope of the present invention as defined by the appended claims.

What is claimed is:

1. A mobile communication device comprising:

a body;

driving means for generating a driving force to move said body;

detecting means for detecting contact pressure of said body with an external device;

receiving means for receiving information from said external device by determining change of said contact pressure detected by said detecting means; and transmitting means for transmitting information to said external device by said driving means varying a magnitude of said driving force so as to vary said contact pressure of said body with said external device in accordance with said information.

2. A mobile communication device according to claim 1, wherein;

said receiving means is for maintaining said driving force at a constant level when said body is in contact with said external device and for receiving information from said external device by determining said change of said contact pressure while said driving force is at said constant level.

3. A mobile reception device comprising:

a body;

driving means for generating a driving force to move said body;

detecting means for detecting contact pressure of said body with an external devices; and receiving means for receiving information from said external device by determining change of said contact pressure detected by said detecting means.

4. A mobile reception device according to claim 3, wherein:

said receiving means is for maintaining said driving force of said driving means at a constant level when said body is in contact with said external device and for receiving information from said external device by determining said change of said contact pressure detected by said detecting means.

5. A mobile reception device according to claim 4, wherein:

said receiving means is for receiving information from said external device by determining said change of said contact pressure while said driving force is at said constant level.

6. A communication system comprising:

a first mobile communication device that includes a first body, first driving means, first detecting means, first receiving means and first transmitting means; and a second mobile communication device that performs communication operations with said first mobile communication device, said second mobile communication device including a second body, second driving means, second detecting means, second receiving means and second transmitting means, wherein:

said first driving means is for generating a first moving force to move said first body;

said first detecting means is for detecting a first contact pressure of said first body with said second body;

said first receiving means is for receiving information from said second mobile communication device by determining change of said first contact pressure detected by said first detecting means;

said first transmitting means is for transmitting information to said second mobile communication device by controlling said first driving means to vary a magnitude of said first moving force to vary said first contact pressure with said second body in accordance with said information;

said second driving means is for generating a second moving force to move said second body;

said second detecting means is for detecting a second contact pressure of said second body with said first body of said first mobile communication device;

said second receiving means is for receiving information from said first mobile communication device by determining change of said second contact pressure detected by said second detecting means; and said second transmitting means is for transmitting information to said first mobile communication device by controlling said second driving means to vary a magnitude of said second moving force to vary said second contact pressure with said first body in accordance with said information.

7. A communication system according to claim 6, wherein:

said first receiving means of said first mobile communication device is for maintaining said first moving force at a constant level when said first mobile communication device is in contact with said second mobile communication device and for receiving information from said second mobile communication device by determining said change of said first contact pressure detected by said first detecting means while said first moving force is at said constant level, and said second receiving means of said second mobile communication device is for maintaining said second moving force at a fixed level when said second mobile communication device is in contact with said first mobile communication device and for receiving information from said first mobile communication device by determining said change of said second contact pressure detected by said second detecting means while said second moving force at said fixed level.

8. A communication system according to claim 6, wherein:

each of said first and second mobile communication devices has a unique delay time associated therewith, each of said mobile communication devices is for acting as a receiver for receiving information from other mobile communication devices when information from other mobile communication devices is received within said delay time associated with said device, and each of said mobile communication devices is for acting as a transmitter for transmitting information to other mobile communication devices unless information from other mobile communication devices is received within said delay time associated with said device.

9. A mobile transmission device comprising:

a body;

driving means for generating a driving force to move said body;

detecting means for detecting contact pressure of said body with an external device; and transmitting means for transmitting information to said external device by controlling said driving means to vary said contact pressure in accordance with said information.

10. A method for communicating between a device with an external device, said method comprising said device:

maintaining a constant position toward said external device;

detecting a contact pressure with said external device during a period of time;

generating, responsive to a change in said detected contact pressure during said period of time, information based on said change in said contact pressure; and varying said contact pressure with said external device in accordance with information when said detected contact pressure is substantially constant during said period of time.

* * * * *